(12) United States Patent  (10) Patent No.: US 7,753,427 B2
Yamamura et al.  (45) Date of Patent: Jul. 13, 2010

(54) ALL-TERRAIN VEHICLE (75) Inventors: Takashi Yamamura, Shizuoka (JP);
Shigehiro Mochizuki, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 50 days.

(21) Appl. No.: 12/361,613

(22) Filed: Jan. 29, 2009

(65) Prior Publication Data
US 2009/0183937 A1 Jul. 23, 2009

Related U.S. Application Data (63) Continuation-in-part of application No. 12/017,865, filed on Jan. 22, 2008.

(51) Int. Cl.
*B60K 13/04* (2006.01)
*B60N 2/005* (2006.01)
*B62D 25/20* (2006.01)

(52) U.S. Cl. ............................ 296/63; 296/64; 180/309; 180/89.2

(58) Field of Classification Search .............. 296/24.34, 296/24.4, 193.07, 204, 63, 64, 65.01, 65.13; 180/89.2, 312, 309
See application file for complete search history.

(56) References Cited

U.S. PATENT DOCUMENTS

| 5,327,989 | A  | * | 7/1994  | Furuhashi et al. | 180/248 |
| 7,168,516 | B2 | * | 1/2007  | Nozaki et al.    | 180/68.3 |
| 7,249,798 | B2 |   | 7/2007  | Saito et al.     |         |
| 7,287,619 | B2 | * | 10/2007 | Tanaka et al.    | 180/291 |
| 7,347,490 | B2 | * | 3/2008  | Kobayashi et al. | 296/204 |
| 2008/0251306 | A1 | * | 10/2008 | Kobayashi et al. | 180/89.2 |

* cited by examiner

*Primary Examiner*—Patricia L Engle
(74) *Attorney, Agent, or Firm*—Keating & Bennett, LLP (57) ABSTRACT An all-terrain vehicle includes a first seat arranged on the vehicle and a second seat arranged behind the first seat. The vehicle includes a first floor arranged in front of the first seat and a second floor arranged between the first seat and the second seat wherein an engine is at least partially arranged between the first floor and the second floor with an exhaust pipe connected to the engine and having a first vertical pipe portion extending downward from a connecting portion to the engine and a horizontal pipe portion extending backward below the second floor.

20 Claims, 7 Drawing Sheets

ALL-TERRAIN VEHICLE

This is a continuation-in-part application of Ser. No. 12/017,865 filed on Jan. 22, 2008 (pending).

FIELD OF THE INVENTION

The present invention relates to an all-terrain vehicle including a first floor arranged in front of a first seat, a second floor arranged between the first seat and a second seat, and an engine arranged between the first floor and the second floor.

BACKGROUND OF THE INVENTION

In the conventional all-terrain vehicle, since the rear wheels are arranged behind the engine arranged below the rear seat, a front/rear dimension of the vehicle becomes large to spoil the compactness of the vehicle. For example, U.S. Pat. No. 7,249,798 discloses a vehicle having a structure in which a front seat and a rear seat are arranged on front and rear sides of the vehicle, an engine is mounted below the rear seat, and left and right rear wheels are arranged behind the engine.

In order to make the vehicle more compact, the engine may be mounted more forward of the rear seat to arrange the rear wheels more forward. However, in this manner, in order to secure a footrest space for a passenger sitting on the rear seat, the piping structure such as an intake pipe and an exhaust pipe disadvantageously becomes complicated.

SUMMARY OF THE INVENTION

What is needed is an all-terrain vehicle which can secure a footrest space for a passenger without complicating a piping structure while making the vehicle compact.

In an exemplary embodiment of the invention, an all-terrain vehicle including: a first seat arranged on the vehicle; a second seat arranged behind the first seat; a first floor arranged in front of the first seat; a second floor arranged between the first seat and the second seat; an engine having at least a part thereof arranged between the first floor and the second floor; and an exhaust pipe connected to the engine and having a first vertical pipe portion downward extending from a connecting portion to the engine and a horizontal pipe portion extending backward from the first vertical pipe portion below the second floor.

In another exemplary embodiment, a all-terrain vehicle includes: a pair of front seats arranged; a rear seat arranged behind the pair of front seats; a pair of front floors arranged in front of the pair of front seats; a rear floor arranged between the pair of front seats and the rear seat; an engine having at least a part disposed between the pair front floors and the rear floor and at least a portion disposed below each of the pair of front seats; and an exhaust pipe connected to the engine and having a first vertical pipe portion extending downward from a connecting portion to the engine and a horizontal pipe portion extending backward below the rear floor.

In exemplary embodiments, since the engine is arranged to have at least a part located between the first floor arranged in front of the first seat and the second floor arranged between the first and second seats, rear wheels can be arranged by using space formed below the second seat. Accordingly, the vehicle can be made compact.

Furthermore, since the exhaust pipe has the first vertical pipe portion downward extending from the connecting portion to the engine and the horizontal pipe portion extending backward from the first vertical pipe portion below the second floor, the second floor can be located at a place lower than the engine connecting portion of the exhaust pipe, and a footrest for a passenger sitting on the second seat can be secured without complicating a structure of the exhaust pipe.

DETAILED DESCRIPTION

Exemplary embodiments are discussed in detail below with reference to the accompanying figures.

FIGS. 1 through 7 are various views of an all-terrain vehicle according to exemplary embodiments of the present invention. Note that in the present specification, "front," "forward," "back," "behind," "rear," "left," and "right" refer to "front," "forward," "back," "behind," "rear," "left," and "right" refer to the perspective of a passenger seated in a seat, unless otherwise noted.

Referring now to the figures generally, an all-terrain vehicle 1 includes a body frame 2, an engine unit 3 mounted on the body frame 2, front wheels 4, 4 arranged at left and right front ends of the body frame 2, and rear wheels 5, 5 arranged at left and right rear ends. The all-terrain vehicle 1 also includes a first seat 6 arranged on the body frame 2, a second seat 7 arranged behind the first seat 6, a first floor 8 arranged in front of the first seat 6, and a second floor 9 arranged between the first seat 6 and the second seat 7. The engine unit 3 is arranged to have at least a part located between the first floor 8 and the second floor 9.

The body frame 2 includes a main frame 2a on which the left and right front wheels 4, the left and right rear wheels 5, and the engine unit 3 are arranged and left and right pillar frames 2b which are upright arranged on left and right sides of the main frame 2 and which form a vehicle chamber A together. The first and second seats 6 and 7 are arranged in the vehicle chamber A.

The main frame 2a has left and right center members 12 extending in a front/rear direction of the vehicle and front and rear cross pipes 14 which connect front ends of the left and right center members 12 to each other, connect rear ends of the left and right center members 12 to each other, and connect the left and right pillar frames 2b to each other. Front and rear planar cross members 13 connect the left and right center members 12. The engine unit 3 is mounted on the cross members 13.

The pillar frames 2b have left and right pillar members 15 which are connected to outer ends of the front and rear cross pipes 14 and configure front and rear entrances 15a and 15b, and a plurality of roof members 16 which connect upper ends of the left and right pillar members 15.

Figure 7:
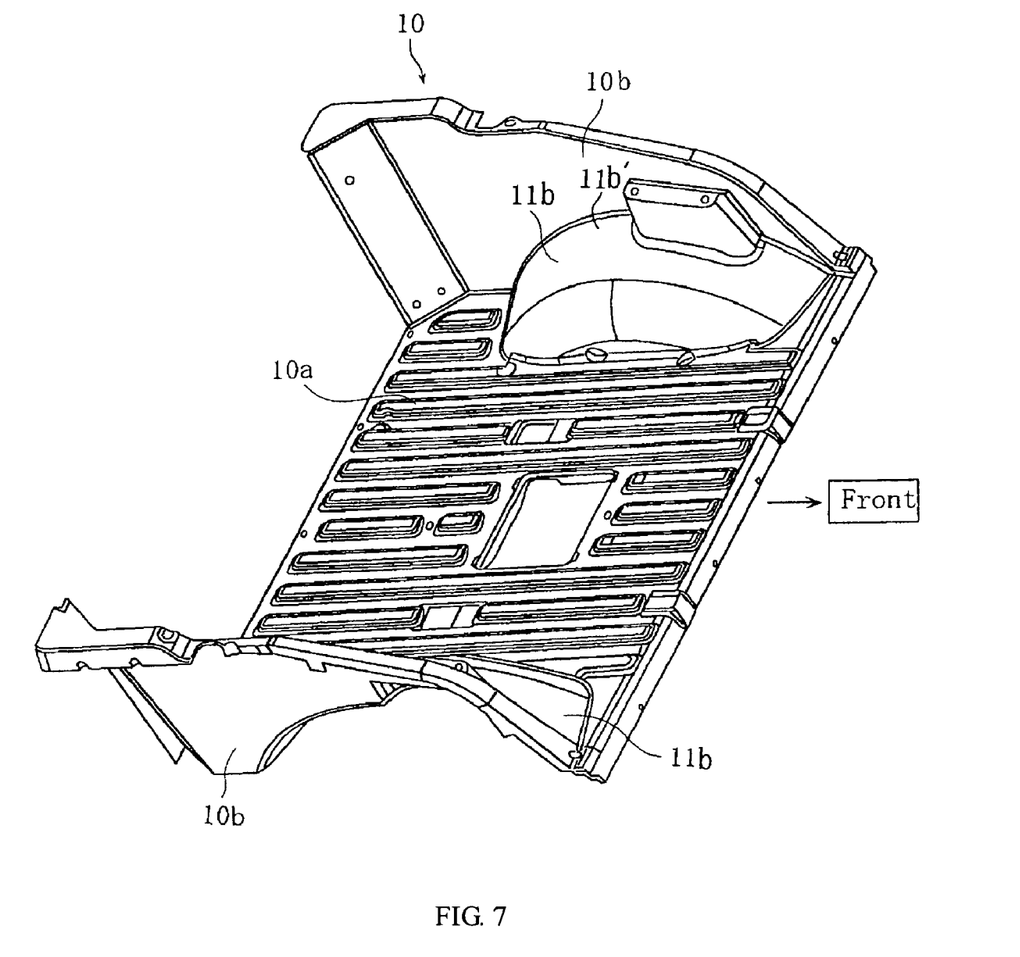
FIG. 7 is a perspective view of a loading space and a rear tier well.

On the body frame 2, behind the second seat 7, a loading space 10 having a level almost equal to a seat level of the second seat 7 is arranged. The loading space 10 consists of a region and has a bottom wall 10a, left and right side walls 10b, and a door 10c constituting a rear wall. Rear tire wells 11 which cover the upper sides of the left and right rear wheels 5 are formed at corners between the bottom wall 10a and the left and right side walls 10b. The rear tire wells 11 are arch-shaped when viewed from a side of the vehicle and has an outer tire well 11a arranged outside the left and right side walls 10b in a width direction of the vehicle and an inner tire well 11b arranged inside the left and right side walls 10b in the width direction of the vehicle. The inner tire well 11b has a shape obtained by expanding inward the left and right side walls 10b in the width direction of the vehicle and upward expanding the bottom wall 10a. In one exemplary embodiment, the highest portion of the arch of the inner tire well 11b is called an upper end 11b'.

A partition wall 23 which partitions a passenger space into the vehicle chamber A and the front chamber B is arranged at a front end portion of the pillar frames 2b. At the center portion of the partition wall 23 in the width direction of the vehicle, a front tunnel portion (projecting portion) 24 extending backward from the partition wall 23 is formed. The front tunnel portion 24 is formed to expand upwardly such that the front tunnel portion 24 is located at a level almost equal to the seat level of the first seat 6, and the engine unit 3 is arranged in the front tunnel portion 24.

A hood 25 which covers an upper portion of the front chamber B formed in front of the partition wall 23 is arrange in an open/closed position. On the left and right sides of the hood 25, front tire wells 26 which cover the upper sides of the front left and right wheels 4 are arranged.

The first floor 8 is arranged on the left and right side portions of the front tunnel portion 24 and connected to the lower ends of the front tunnel portion 24, the partition wall 23, the left and right pillar members 15. The second floor 9 has left and right footrests 9b arranged at a position having a level almost equal to that of the first floor 8. A rear tunnel portion (projecting portion) 9a projecting upward at the center portion in the width direction of the vehicle and extending in the front/rear direction is formed between the left and right footrests 9b.

The rear tunnel portion (projecting portion) 9a is arranged at a position lower than the front tunnel portion 24 and continuously connected to the front tunnel portion 24. In the rear tunnel portion 9a, a heat insulating plate 27 covers an exhaust pipe 31 and a change box (not shown) that houses a cup holder or the like is formed between the heat insulating plate 27 and the rear tunnel portion 9a.

In one exemplary embodiment, the front chamber B is a space surrounded by the main frame 2a, the partition wall 23, and the hood 25 in a side view and communicates with a space surrounded by the main frame 2a, the front tunnel portion 24, and the rear tunnel portion 9a.

The first seat 6 is configured by the left and right seats 6a and 6b with a predetermined interval in the width direction of the vehicle. Each of the left and right seats 6a and 6b has a seat cushion 6c, a seat back 6d, and a headrest 6e. A steering wheel 17 is arranged in front of the left seat 6a. The front tunnel portion 24 is arranged between the left and right seats 6a and 6b.

The first seat 6 is arranged on a front seat frame (not shown) arranged upright on the main frame 2a. The second seat 7 is arranged at a position substantially as high as the first seat 6, and has a bench seat cushion 7a and a seat back 7b for two passengers. A headrest 7c is arranged above the seat back 7b. The seat cushion 7a is arranged to be located between the left and right rear tire wells 11, and the seat level thereof is arranged at a position lower than the upper ends 11b' of the rear tire wells 11. The second seat 7 is arranged on a loading space frame 18 arranged upright on the main frame 2a. The loading space frame 18 has a level almost equal to that of the seat frame.

Figure 5:
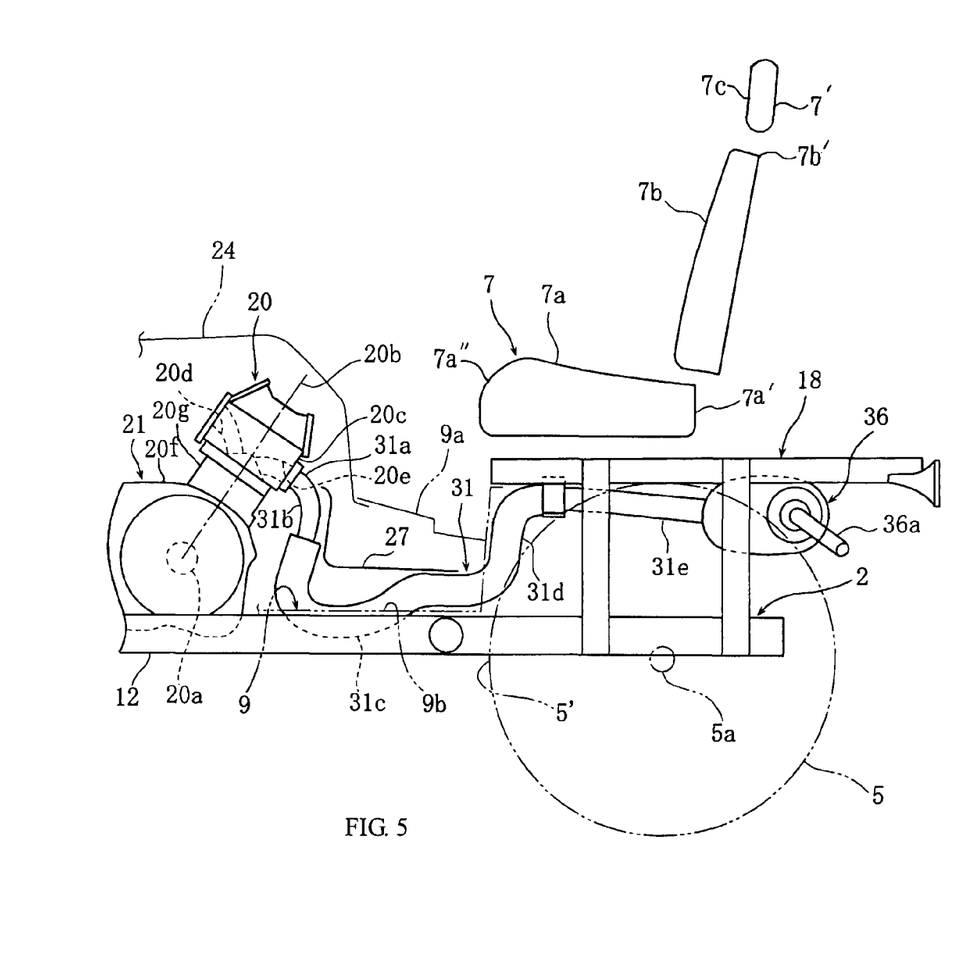
FIG. 5 is a side view of an exhaust pipe of the engine unit mounted on the body frame.
Figure 6:
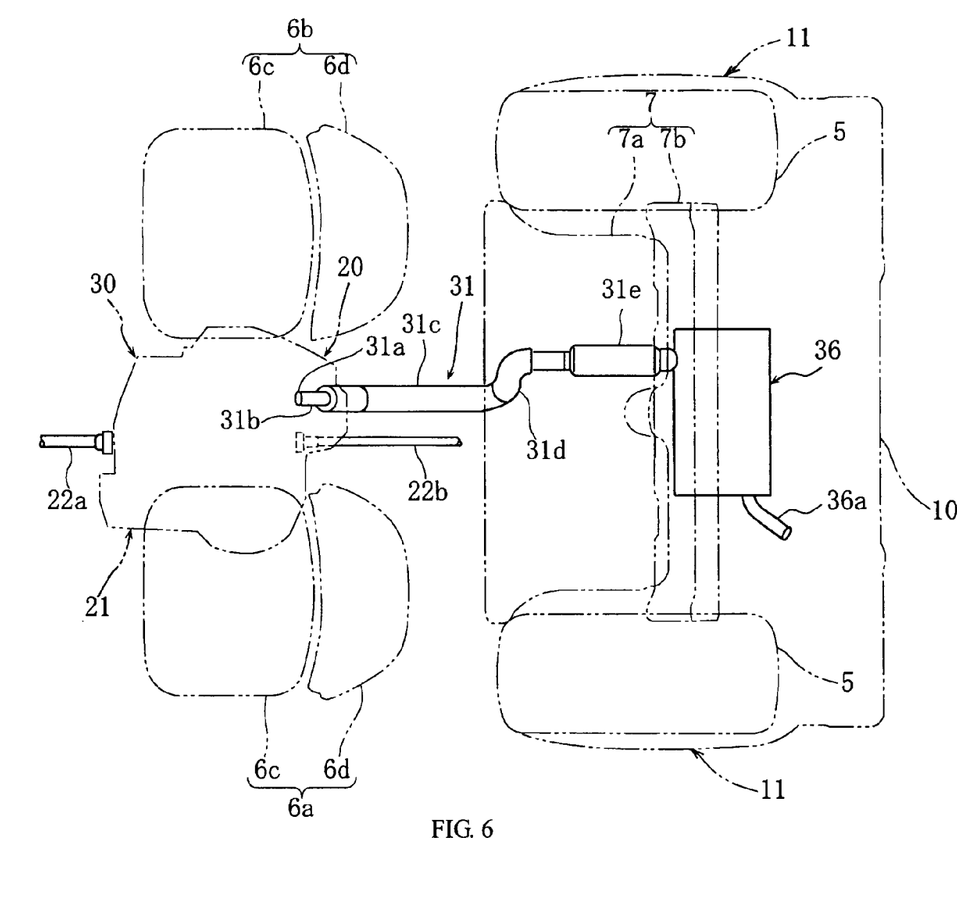
FIG. 6 is a plan view of the exhaust pipe.

Referring now to FIG. 5, the rear wheels 5 are arranged below the second seat 7. The rear wheel 5 has a front end 5' located more forward of a rear end 7' of the headrest 7c of the second seat 7, and a rear wheel axle 5a is arranged to be located in front of the rear end 7' of the headrest 7c.

As used herein the rear end of the seat means a rear end of an entire seat including the seat cushion, the seat back, and the headrest. Therefore, when a seat does not have a headrest, the rear end of the seat back is the rear end of the seat. For a seat in which the rear end of the seat cushion is rearmost, the rear end of the seat cushion is the rear end of the seat, as a matter of course.

The engine unit 3 has a structure in which a water-cooled four-cycle engine 20 mounted on a center portion of the left and right center members 12 in the front/rear direction of the vehicle and a V-belt continuously variable transmission 21 arranged on a left side of the engine 20 in the width direction of the vehicle are integrated with each other. The engine 20 has a structure in which a cylinder body 20g and a cylinder head 20c are stacked and combined on a crank case 20f.

Figure 1:
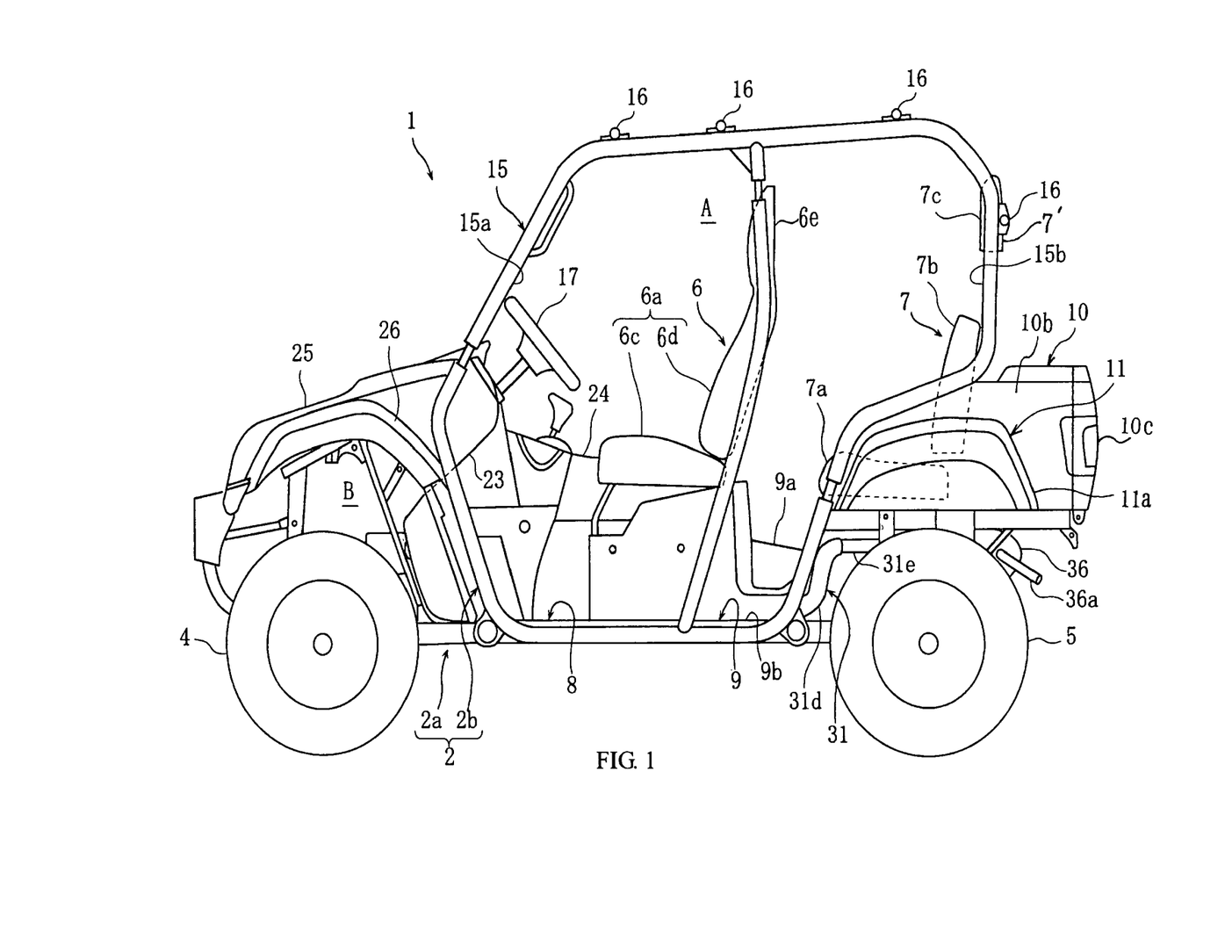
FIG. 1 is a side view of an all-terrain vehicle according to an embodiment of the present invention.
Figure 2:
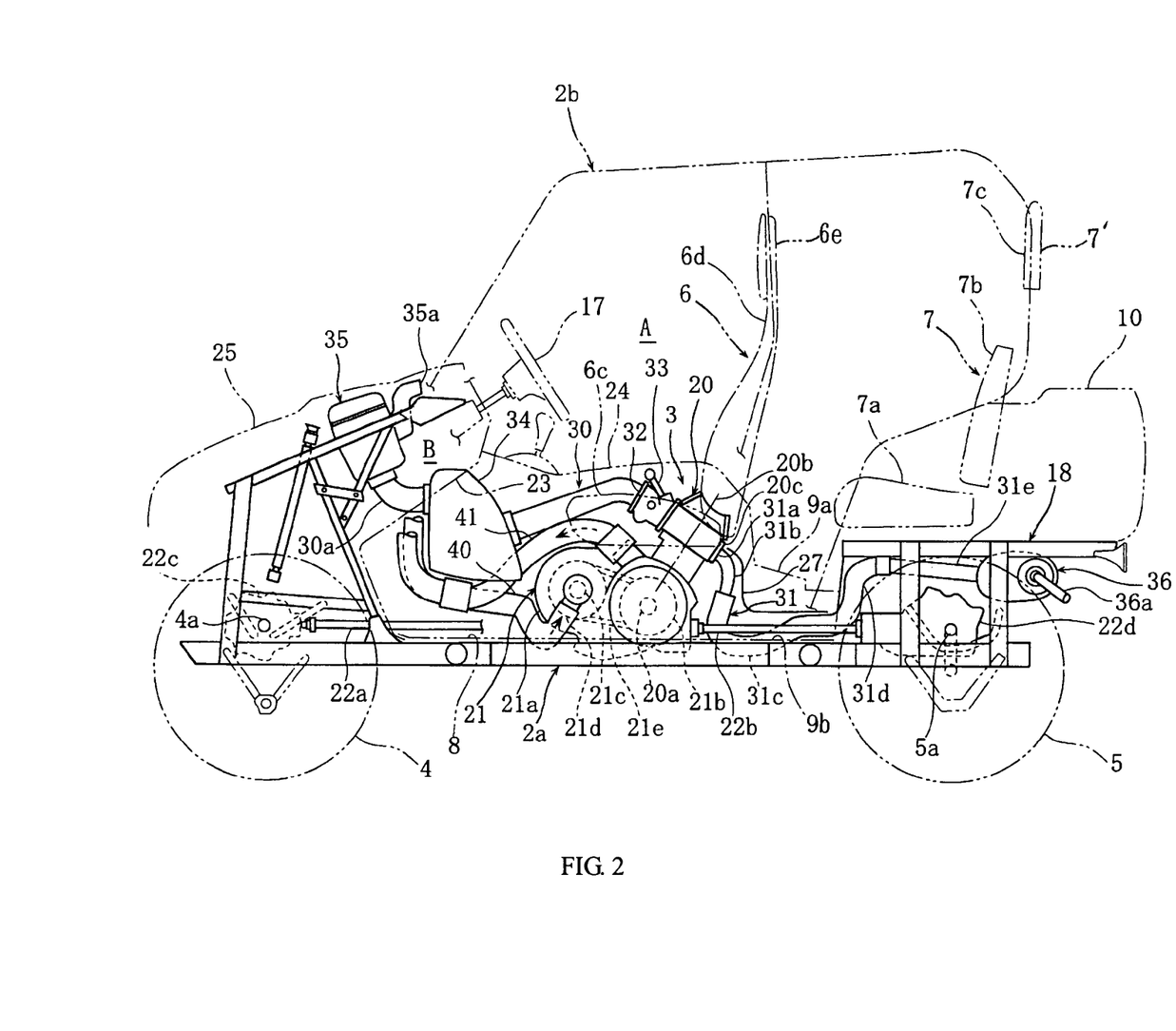
FIG. 2 is a side view of a body frame on which an engine unit of the vehicle is mounted.
Figure 3:
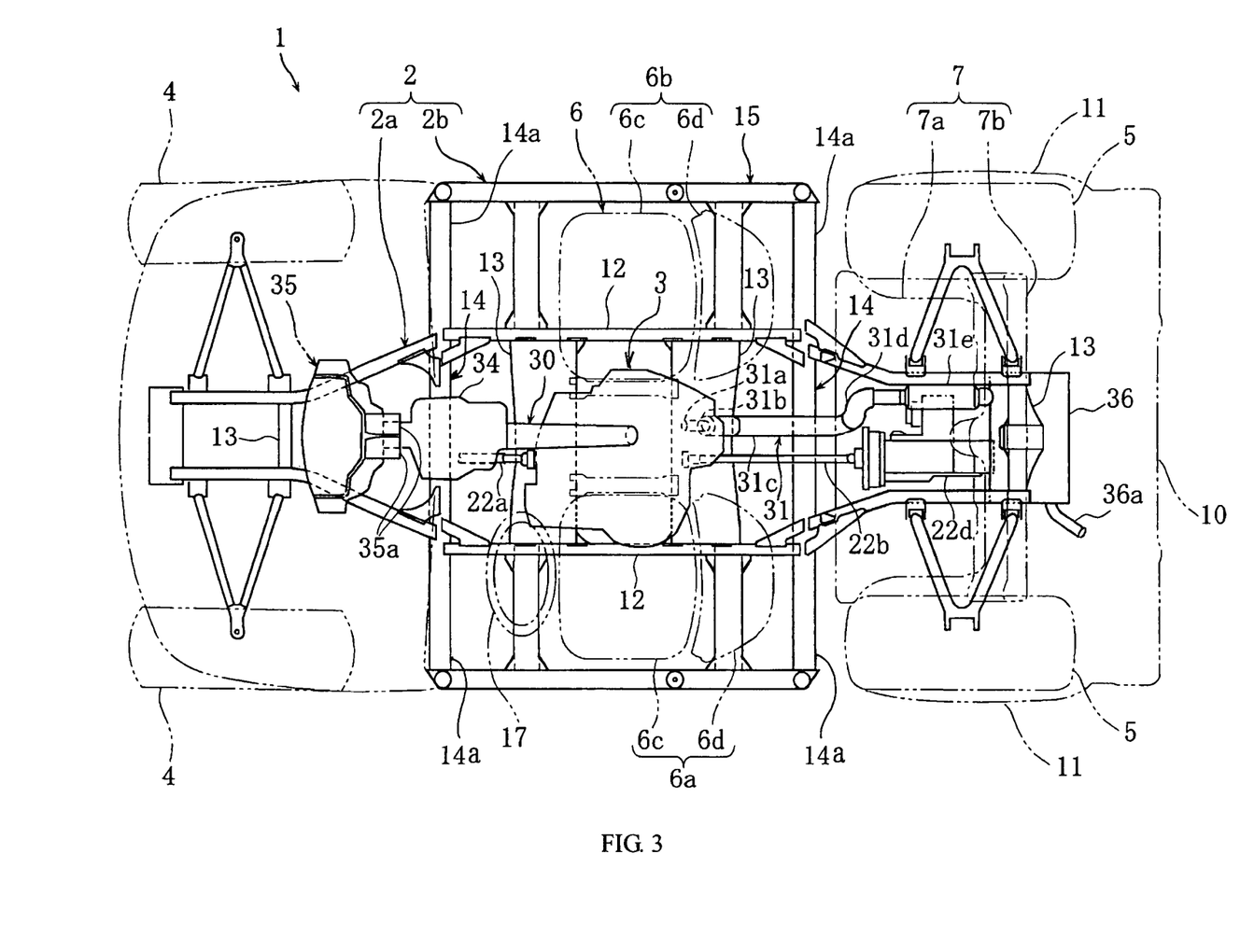
FIG. 3 is a plan view of the body frame.
Figure 4:
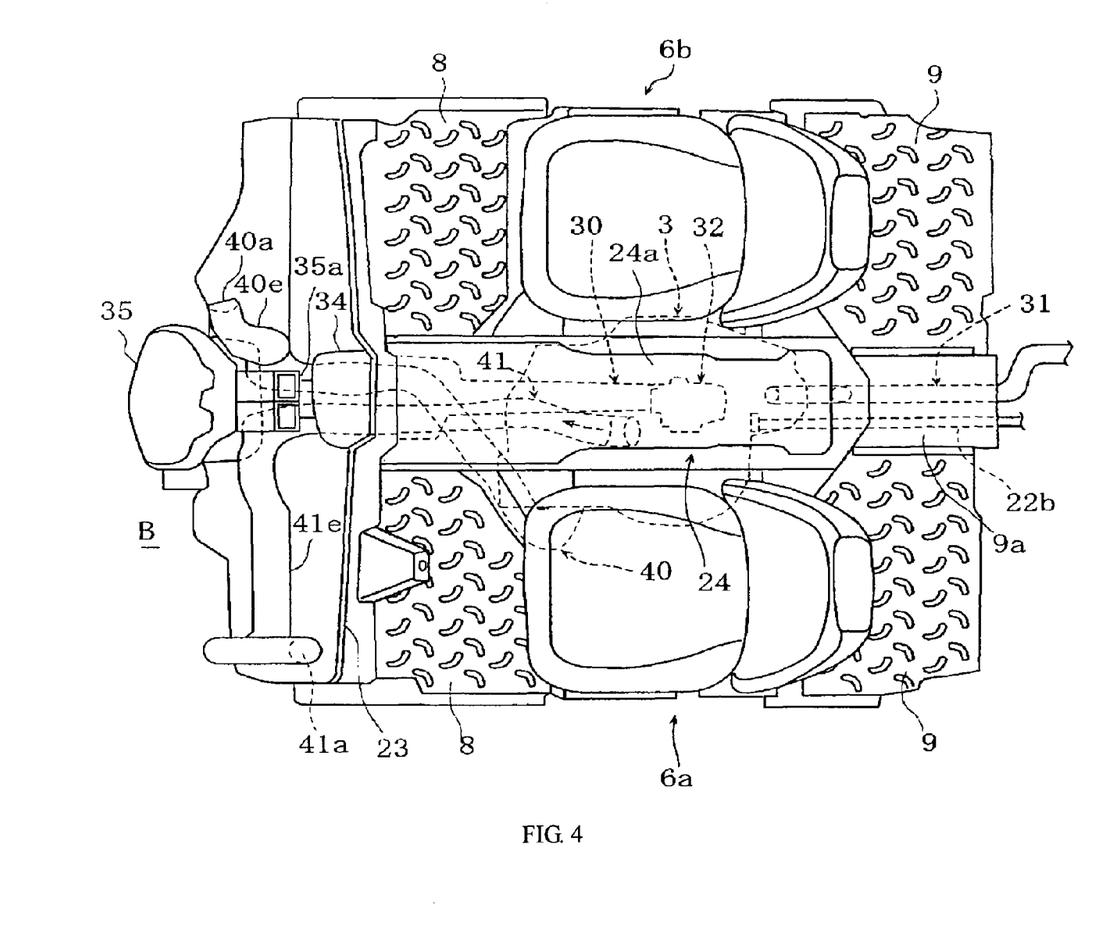
FIG. 4 is a plan view showing an arrangement state of a floor, a tunnel portion, an engine unit, and respective passages.

Referring now to FIG. 2, the continuously variable transmission 21 is connected to the engine 20, and has a transmission case 21a extending forward from the engine 20, a drive pulley 21b housed in the transmission case 21a and attached to a crank shaft 20a of the engine 20, a driven pulley 21d attached to an output shaft 21c parallel to the crank shaft 20a, and a V-belt 21e wound on the driven pulley 21d and the drive pulley 21b.

The output shaft 21c is connected to the front and rear power transmission shafts 22a and 22b. The front and rear power transmission shafts 22a and 22b are also connected to the front and rear wheel axles 4a and 5a through front differential devices 22c and 22d.

The transmission case 21a is connected a cooling air supply duct 40 which supplies cooling air and a cooling air exhaust duct 41 which discharges the air obtained after the cooling. The cooling air supply duct 40 and the cooling air exhaust duct 41 are arranged to extend forward in the front tunnel portion 24, an air inlet and an air outlet (not shown) are arranged on the upper portion of the front chamber B to be horizontally spaced apart from each other.

The engine 20 is mounted such that the crank shaft 20a is almost horizontal in the width direction of the vehicle and the cylinder axis 20b faces diagonally backward and upward. The engine 20 is arranged such that the cylinder head 20c overlaps the seat cushion 6c and the continuously variable transmission 21 is located below the seat cushion 6c when viewed from a side of the vehicle.

As shown in FIG. 5, the engine 20 is mounted such that an intake port 20d opened on a front side wall of the cylinder head 20c faces the front side of the vehicle and an exhaust port 20e open on a rear side wall faces the rear side of the vehicle.

An intake pipe 30 extending from the intake port 20d to the front of the vehicle is connected to the exhaust port 20e of the cylinder head 20c. An exhaust pipe 31 extending from the exhaust port 20e to the rear of the vehicle is connected to the exhaust port 20e. The intake pipe 30 and the exhaust pipe 31 are almost linearly arranged substantially along a center line of the vehicle in the front/rear direction when viewed from the above. The intake pipe 30 is connected to the cylinder head 20c through a throttle body 32 having a fuel injection valve 33.

In the middle of the intake pipe 30, a surge tank 34 is interposed. The surge tank 34 is arranged ahead of the engine unit 3 in the tunnel portion 24. An air cleaner 35 is connected to the surge tank 34 through an intake air supply pipe 30a. The air cleaner 35 is arranged near a lower side of the hood 25 at the center portion in the width direction of the vehicle. An intake port 35a of the air cleaner 35 is opened in the front chamber B between the hood 25 and the partition wall 23.

The exhaust pipe 31 includes a first vertical pipe portion 31b almost vertically extending from a connection unit 31a connected to the cylinder head 20c to the lower side, a horizontal pipe portion 31c extending from a lower end of the first vertical pipe portion 31b to the rear side under a second floor 9. When viewed from a side of the vehicle, the horizontal pipe portion 31c partially overlaps the side member 12 of the body frame 2. The first vertical pipe portion 31b and the horizontal pipe portion 31c are arranged to overlap the rear tunnel portion 9a of the second floor 9 in a plane view.

The rear power transmission shaft 22b is arranged to be located in the rear tunnel portion 9a and on the left side of the exhaust pipe 31 in the width direction of the vehicle. The exhaust pipe 31 includes a second vertical pipe portion 31d extending upright from a rear end of the horizontal pipe portion 31c to the upper side, and an extending portion 31e extending from an upper end of the second vertical pipe portion 31d to the rear side of the vehicle between the second seat 7 and a wheel axle 5a of the rear wheels 5.

A second vertical pipe portion 31d is arranged below a seat cushion 7a such that the second vertical pipe portion 31d is located behind a front end 7a" of the seat cushion 7a of the second seat 7 in a side view. The extending portion 31e is arranged such that the extending portion 31e is displaced from the horizontal pipe portion 31c to the right side in the width direction of the vehicle in a plan view, and extends along a lower surface of the loading space frame 18, thereby avoiding interference between the extending portion 31e and the rear differential device 22d.

The exhaust pipe 31 includes a muffler 36 connected to a rear end of the extending portion 31e and arranged in the rear of the second seat 7. The muffler 36 has an elliptic shape having a vertical dimension larger than a horizontal dimension, and is arranged to have an axial line along the width direction of the vehicle. The muffler 36 is attached to the bottom of the loading space frame 18. A tail pipe 36a extending diagonally backward and downward is connected to a left wall of the muffler 36. In an exemplary embodiment, since the engine unit 3 is arranged between the first floor 8 arranged in front of the first seat 6 and the second floor 9 arranged between the first seat 6 and the second seat 7, the left and right rear wheels 5 can be arranged on the front side of the vehicle by using a space formed below the second seat 7. For this reason, the vehicle can be made compact.

In an exemplary embodiment, the exhaust pipe 31 has a first vertical pipe portion 31b extending almost vertically from a connection unit 31a to the engine 20 to the lower side and a horizontal pipe portion 31c extending from the lower end of the first vertical pipe portion 31b to the rear side below the second floor 9. For this reason, the second floor 9 can be arranged at a position lower than the engine connection unit 31a of the exhaust pipe 31. A footstep space for a passenger sitting on the second seat 7 can be secured without complicating the structure of the exhaust pipe 31.

In another exemplary embodiment, the rear tunnel portion 9a projecting upward is formed on the center portion of the second floor 9 in the width direction of the width, and the first vertical pipe portion 31b and the horizontal pipe portion 31c are arranged to overlap the rear tunnel portion 9a in a plan view. For this reason, the footrests 9b of the second floor 9 can be located at a lower position without interfering with the exhaust pipe 31, and a footrest space for a passenger sitting on the second seat 7 can be secured.

The rear wheels 5 may be arranged below the second seat 7, and the front ends 5' thereof are arranged more forward of the rear ends 7', the vehicle can be made compact compared with a conventional arrangement in which the rear wheels are arranged behind the second seat. In addition, since the rear wheels 5 are arranged more forward of the rear end 7' of the second seat 7, the vehicle can be made more compact.

Furthermore, in exemplary embodiments, the second seat 7 in which the rear end 7b' of the seat back 7b is located more forward of the rear end 7' of the headrest 7c and the rear end 7a' of the seat cushion 7a is located in front of the rear end 7b' of the seat back 7b is employed. In this manner, since the front ends 5' and the rear wheels 5 and the rear wheel drive shaft 5a are located in front of the rear end 7a' of the seat cushion 7a of the second seat 7 located on the front side of the vehicle, the vehicle can be made more compact.

The second seat 7 may be arranged between the rear tire wells 11 which cover the upper sides of the left and right rear wheels 5, and the seat level of the seat cushion 7a is arranged lower than the upper end 11' of the rear tire wells 11. Accordingly, a level at which the seat cushion 7a is arranged can be lowered while securing amounts of oscillation of the rear wheels 5, and a passenger space can be secured.

The second vertical pipe portion 31d extends upward from the rear end of the horizontal pipe portion 31c and the extending portion 31e extends from the upper end of the second vertical pipe portion 31d between the second seat 7 and the rear wheel axle 5a. Accordingly, the exhaust pipe 31 can be arranged without interfering with the rear differential device 22d and the rear wheel axle 5a arranged below the second seat 7.

In addition, a muffler 36 is connected to the extending portion 31e, and the muffler 36 is arranged behind the second seat 7 and below the loading space 10. Accordingly, the muffler 36 can be arranged in open space while avoiding thermal effect on the second seat 7, and the capacity of the muffler 36 can be increased. Since the muffler 36 has an axis being along the width direction of the vehicle, the front/rear dimension of the muffler 36 can be reduced while securing the muffler capacity, and muffler 36 can be compactly arranged.

In exemplary embodiments, when viewed from a side of the vehicle, the horizontal pipe portion 31c is arranged such that the horizontal pipe portion 31c partially overlaps the rear tire wells 11 of the body frame 2. Accordingly, the horizontal pipe portion 31c can be arranged at a lower position, the level position of the first floor 8 can be lowered, and a footrest space for a passenger can be secured. In addition, since the second vertical pipe portion 31d is located behind the front end 7a" of the second seat 7, the length of the exhaust pipe can be secured while securing a riding space for a passenger sitting on the second seat.

In exemplary embodiments, so-called backward exhaust can be achieved because the exhaust port 20e of the engine 20 is arranged to face in a direction from the cylinder head 20c to the rear of the vehicle. Accordingly, the piping structure of the exhaust pipe 31 can be simplified, and the length of the exhaust pipe can be shortened.

In exemplary embodiments, the cylinder unit of the engine 20 is tilted backward because the engine 20 is arranged such that the cylinder axis 20b faces diagonally backward and upward. Accordingly, the first vertical pipe portion 31b can be extended directly downward from the cylinder head 20c, and the curvature of the exhaust pipe 31 can be reduced, and an exhaust resistance can be reduced.

In exemplary embodiments, the exhaust port 20e is arranged in a backward direction from the cylinder head 20c. However, the exhaust port can be arranged in a backward direction from the cylinder head. In this case, the first vertical pipe portion is extended from a front wall of the cylinder head to the lower side, and the horizontal pipe portion is extended from the lower end of the first vertical pipe portion to the rear of the vehicle through a lateral side or lower side of the engine.

What is claimed is:

1. An all-terrain vehicle comprising:
   a first seat arranged on the vehicle;
   a second seat arranged behind the first seat;
   a first floor arranged in front of the first seat;
   a second floor arranged between the first seat and the second seat;
   an engine having at least a part arranged between the first floor and the second floor; and
   an exhaust pipe connected to the engine and having a first vertical pipe portion extending downward from a connecting portion to the engine and a horizontal pipe portion extending backward below the second floor.

2. The all-terrain vehicle according to claim 1, wherein the second floor has a projecting portion which expands upward at a center portion in a width direction of the vehicle and extends in a front/rear direction of the vehicle, and the first vertical pipe portion and the horizontal pipe portion of the exhaust pipe are arranged to overlap the projecting portion in a plan view.

3. The all-terrain vehicle according to claim 1, wherein the second floor is arranged at a position lower than a seat level of the second seat.

4. The all-terrain vehicle according to claim 1, further comprising rear wheels which are arranged below the second seat and have front ends located in front of a rear end of the second seat.

5. The all-terrain vehicle according to claim 4, wherein the rear wheels are arranged to have a wheel axle located more forward of the rear end of the second seat.

6. The all-terrain vehicle according to claim 4, wherein the second seat is arranged between left and right tire wells which cover the upper sides of the left and right rear wheels, and at least a part of the second seat is arranged at a position lower than upper ends of the tire wells.

7. The all-terrain vehicle according to claim 1, wherein the exhaust pipe includes a second vertical pipe portion upright extending from a rear end of the horizontal pipe portion to an upper side.

8. The all-terrain vehicle according to claim 7, wherein at least a part of the second vertical pipe portion is located behind a front end of the second seat.

9. The all-terrain vehicle according to claim 7, wherein the exhaust pipe includes an extending portion extending from an upper end of the second vertical pipe portion to a rear of the vehicle between the second seat and a drive shaft of the rear wheels.

10. The all-terrain vehicle according to claim 9, wherein the exhaust pipe includes a muffler connected to the extending portion and arranged behind the second seat.

11. The all-terrain vehicle according to claim 10, wherein the muffler is arranged to have a shaft line in the width direction of the vehicle.

12. The all-terrain vehicle according to claim 1, wherein a part of the horizontal pipe portion of the exhaust pipe overlaps a body frame when viewed from a side of the vehicle.

13. The all-terrain vehicle according to claim 1, wherein the engine is mounted so that an exhaust port faces the rear of the vehicle.

14. The all-terrain vehicle according to claim 13, wherein the engine is mounted so that a cylinder axis faces diagonally backward and upward.

15. The all-terrain vehicle according to claim 5, wherein the second seat is arranged between left and right tire wells which cover the upper sides of the left and right rear wheels, and at least a part of the second seat is arranged at a position lower than upper ends of the tire wells.

16. An all-terrain vehicle comprising:
    a pair of front seats arranged;
    a rear seat arranged behind the pair of front seats;
    a pair of front floors arranged in front of the pair of front seats;
    a rear floor arranged between the pair of front seats and the rear seat;
    an engine having at least a part disposed between the pair front floors and the rear floor and at least a portion disposed below each of the pair of front seats; and
    an exhaust pipe connected to the engine and having a first vertical pipe portion extending downward from a connecting portion to the engine and a horizontal pipe portion extending backward below the rear floor.

17. The all-terrain vehicle according to claim 16, wherein the rear floor has a projecting portion which expands upward at a center portion in a width direction of the vehicle and extends in a front/rear direction of the vehicle, and the first vertical pipe portion and the horizontal pipe portion of the exhaust pipe are arranged to overlap the projecting portion in a plan view.

18. The all-terrain vehicle according to claim 17, wherein the rear floor is arranged at a position lower than a seat level of the rear seat.

19. The all-terrain vehicle according to claim 17, further comprising rear wheels which are arranged below the rear seat and have front ends located in front of a rear end of the rear seat.

20. The all-terrain vehicle according to claim 19, wherein the rear seat is arranged between left and right tire wells which cover the upper sides of the left and right rear wheels, and at least a part of the rear seat is arranged at a position lower than upper ends of the tire wells.

* * * * *